US010616293B1

(12) United States Patent
Zeng et al.

(10) Patent No.: US 10,616,293 B1
(45) Date of Patent: Apr. 7, 2020

(54) MULTIPLE ACCOUNT BINDING

(71) Applicant: Amazon Technologies, Inc., Seattle, WA (US)

(72) Inventors: Jing Zeng, Seattle, WA (US); Yannick Theil, Seattle, WA (US); Ryan Ragona, Seattle, WA (US); Shane Whitfield, Bellevue, WA (US); Meir Wasserman, Edmonds, WA (US); Jeremy Bird, Seattle, WA (US); Stephen Levy, Lynnwood, WA (US); Patrick Elliott, Seattle, WA (US); Eric McCambridge, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 66 days.

(21) Appl. No.: 15/627,244

(22) Filed: Jun. 19, 2017

(51) Int. Cl.
*H04L 29/06* (2006.01)
*A63F 13/79* (2014.01)
*A63F 13/335* (2014.01)

(52) U.S. Cl.
CPC ........ *H04L 65/4076* (2013.01); *A63F 13/335* (2014.09); *A63F 13/79* (2014.09)

(58) Field of Classification Search
None
See application file for complete search history.

(56) References Cited

U.S. PATENT DOCUMENTS

| 5,946,664 | A | * | 8/1999 | Ebisawa | A63F 13/12 705/14.5 |
| 10,166,479 | B1 | * | 1/2019 | Koh | A63F 9/24 |
| 2002/0090985 | A1 | * | 7/2002 | Tochner | A63F 13/12 463/1 |
| 2004/0148221 | A1 | * | 7/2004 | Chu | A63F 13/12 705/14.51 |
| 2006/0287105 | A1 | * | 12/2006 | Willis | A63F 13/12 463/42 |
| 2010/0069148 | A1 | * | 3/2010 | Cargill | A63F 13/65 463/25 |
| 2012/0244945 | A1 | * | 9/2012 | Kolo | A63F 13/61 463/42 |
| 2013/0040714 | A1 | * | 2/2013 | Rosing | A63F 13/65 463/7 |
| 2014/0018157 | A1 | * | 1/2014 | Kern | H04L 67/38 463/25 |
| 2017/0189816 | A1 | * | 7/2017 | Van Briggle | A63F 13/69 |
| 2017/0368454 | A1 | * | 12/2017 | Sivak | A63F 13/355 |

* cited by examiner

*Primary Examiner* — Philip J Chea
*Assistant Examiner* — Hassan A Khan
(74) *Attorney, Agent, or Firm* — Knobbe, Martens, Olson & Bear, LLP

(57) ABSTRACT

A system and method for providing gaming media streams. One or more users request a gaming media stream broadcast corresponding to game play. A broadcast service obtains the gaming media stream that includes a gaming stream identifier and user identifier. The broadcast service can also determine whether users qualify for entitlements based on state information corresponding to a binding of two or more separable user accounts. The broadcast service provides the gaming media stream and qualified entitlements.

20 Claims, 10 Drawing Sheets

MULTIPLE ACCOUNT BINDING

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, client computing devices may interact with data center resources in an interactive format, such as game play. In such embodiments, one or more additional client computing devices may request access to the game play media stream.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
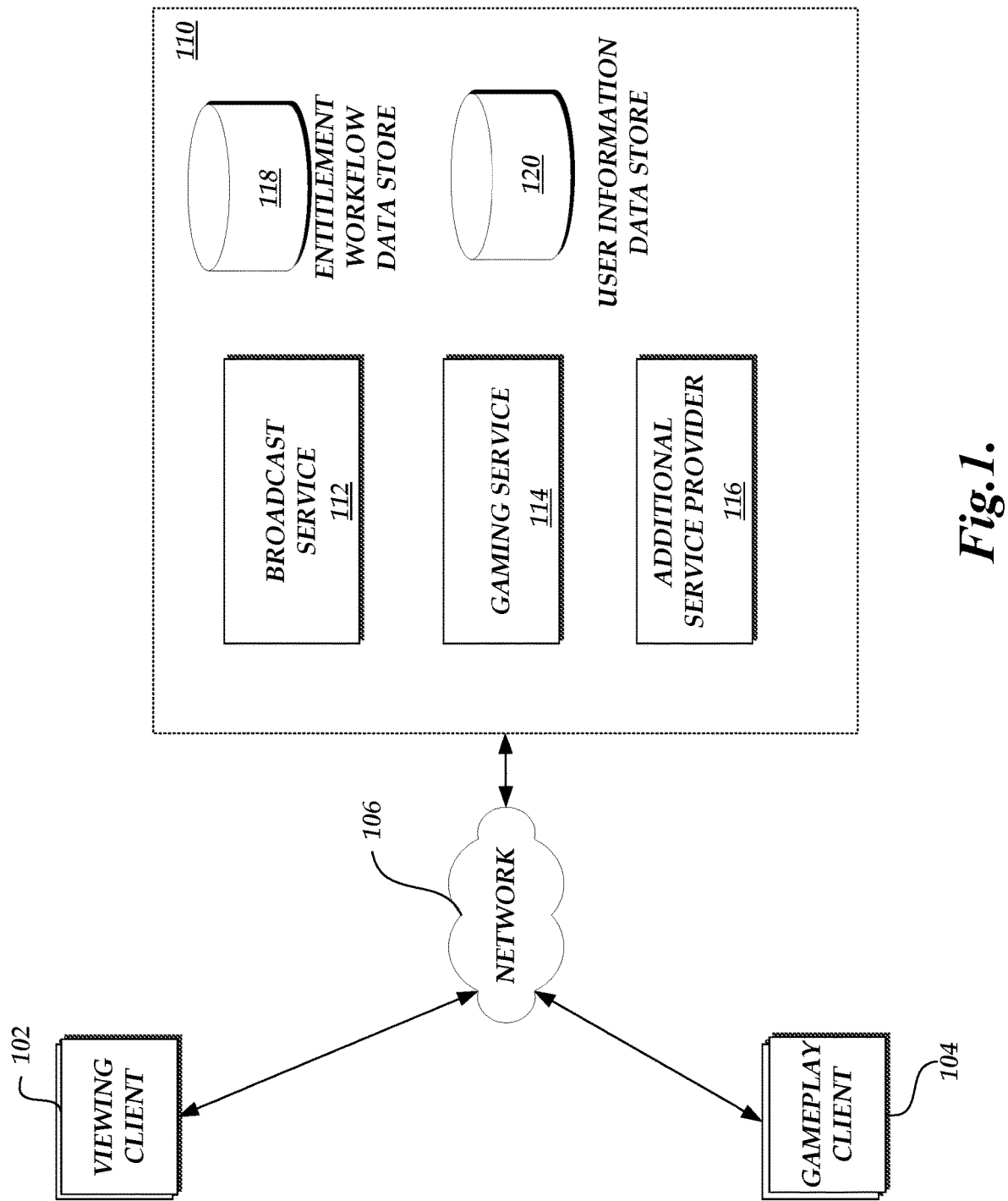
FIG. 1 is a block diagram depicting an illustrative logical network including multiple client computing devices and a service provider network.

Generally described, the present application corresponds to generating media streams corresponding to gaming content. More specifically, aspects of the present application relate to the processing of requests from users to access gaming content. Illustratively, requesting and accessing gaming content can qualify users for additional digital content provided by third party gaming providers, such as the third-party gaming provider generating the gaming content. Such digital content can include, but is not limited to, features related to gaming play, such as access to characters or character enhancements, exclusive game play, access to accessories used in game play, enhancements to game play, and the like. Still further, in illustrative embodiments, the qualification of users for the additional digital content, generally referred to as entitlements, can be based on a combination of satisfying criteria related to requested game play and maintaining active subscription accounts. The definition and application of the criteria can be generally referred to as an entitlement workflow. As applied to one aspect of the present application, a service provider can implement entitlement workflows that include a requirement of binding of multiple, separable subscription accounts.

One or more client computing devices can utilize a browser application or browsing application functionality to request gaming content provided by a broadcast service via a communication network. Illustratively, in one embodiment, the gaming content is generated by a third-party interaction with a gaming service that results in the generation of a gaming media stream. The request for the gaming content can include one or more identifiers that are used to determine the requested gaming stream and one or more identifiers that can be utilized to determine characteristics of the requesting user.

Based on the processed requests, the broadcast service can then generate individual responsive user interfaces to respective requesting users that include the gaming stream from the gaming service. Additionally, in some embodiments, the broadcast service can register requesting users for receipt of entitlements based on the requested gaming stream information and maintenance of two or more subscription accounts. Illustratively, in some embodiments, a first subscription account can correspond to a subscription account associated with the broadcast service and relating to accessing or requesting gaming stream data. A second subscription account can correspond to a subscription account with an additional service provider, such as a retail service provider or other service provider that would not be characterized as duplicative to the broadcast service. By implementing entitlement workflows that require a binding two or more subscription accounts, the broadcast service and additional service provider can promote cross selling opportunities and service exploration by users. Additionally, in some embodiments, the broadcast service can further use state information related to the status of identified subscription accounts and whether they remain bound to mitigate the granting of entitlement to users in situations not in conformance with the entitlement workflows.

In accordance with other aspects of the present application, the broadcast service can further interact with third party gaming services to obtain entitlement information, such as unique keys or other identifiers, related to allowing users to gain access to awarded entitlements. Using the obtained entitlement information, the broadcast service can then evaluate the entitlement workflows and associate individual entitlement information to qualifying users. The broadcast service can then provide the third-party gaming service providers with user account information and the associated individual entitlement information. The third-party gaming service can then process the user account information and individual entitlement information in a manner that provides users with the associated entitlement in a manner that does not require the user to request access to the entitlement or request that the third-party gaming service access associated entitlements.

Although aspects of some embodiments described in the disclosure will focus on the illustrative interactions for requesting browser content and awarding of specific entitlements, one skilled in the relevant art will appreciate that the examples are illustrative only and are not intended to be limiting.

FIG. 1 is a block diagram depicting an illustrative logical network 100 including multiple viewing client computing devices 102, multiple gameplay client computing devices 104, and a service provider system 110 in communication via a network 106. While the viewing client computing devices 102 and gameplay client computing devices 104 are shown as a group within FIG. 1, the client computing devices 102 and gameplay client computing devices 104 may be geographically distant, and independently owned or operated. Likewise, although the client computing devices 102 and gameplay client computing devices 104 are logically represented as separate devices, one or more computing devices can function as client computing devices 102 and gameplay client computing devices 104. Accordingly, the groupings of client computing devices 102 and gameplay client computing devices 104 within FIG. 1 is intended to represent a logical, rather than physical, grouping. Similarly, while one set of illustrative components is shown to represent the service provider system 110, multiple instances of each component may be present within the service provider system 110, and such components may be located within geographically diverse areas (e.g., globally, continentally, or regionally), in order to provide a wide geographical presence for the service provider system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, gameplay client computing devices 104 and the service provider system 110 is depicted as having a single connection to the network 106, individual components of the client computing devices 102 and gameplay client computing devices 104, and service provider system 110 may be connected to the network 106 at disparate points.

Client computing devices 102 and gameplay client computing devices 104, generally "client computing devices" may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device may include one or more data stores (not shown in FIG. 1) including various applications or computer-executable instructions, such as web browsers, used to implement the embodiments disclosed herein. An illustrative example of a viewing client computing device 102 will be described with regard to FIG. 3.

In accordance with embodiments, the service provider system 110 includes a set of services for implementing one or more aspects of the present application. As described in further detail below, the service provider system 110 can include one or more computing devices for implementing a broadcast service 112. Illustratively, the broadcast service 112 can process requests for game play streams from viewing client devices 102, which can include a requested game play stream. The broadcast service 112 can also process requests for receiving entitlements related to identifiable games, which can be implemented separately from the processing of requests for game play streams. The service provider system 110 can also include one or more computing devices for implementing a game service 114. Illustratively, the gaming service 114 can host one or more interactive games with gameplay client computing devices 104 to generate a resulting game play media stream that can be provided to client computing devices 102 (via the broadcast service 112) and gameplay client computing devices 104. The service provider system 110 can further include one or more computing devices for implementing one or more additional service providers 116 that are associated with at least one of the subscription accounts considered in the evaluation of the entitlement workflows by the broadcast service 112.

As further illustrated in FIG. 1, the service provider system 110 can include an entitlement workflow data store 118 that maintains information related to criteria utilized by the broadcast service 112 in the determination of the granting of entitlements to individual users. The service provider system 110 can also include a user information data store 120 that corresponds generally to one or more data stores for maintaining profile information associated with the identification and validation of users, such as account data, passwords, financial or transaction information, biographical information and the like. As will be described in greater detail below, the user information data store can maintain state information related to the current status of individual subscription account information for identified users. Additionally, the state information can also include an identification of a binding status (e.g., which user accounts are bound together). Generally, the entitlement workflow data store 118 and user information data store 120 represent one or more data stores that can provide or maintain information related to one or more aspects of the present application.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting broadcast service 112, the gaming service 114, and additional service provider 116 may be executed by one more virtual machines implemented in a hosted computing environment. Additionally, the entitlement workflow data store 118 and the user information data store 120 may correspond to multiple physical or virtual computing resources that may logically represented as a single component, but may be implement in a distributed manner. Still further, although the service provider system 110 is depicted as hosting the stand-alone services (e.g., the broadcast service 112, the gaming service 114, and the additional service provider 116), the implementation of any of the identified services may be in conjunction with other services provided by, or associated with, the service provider system 110. Likewise, one or more services or data stores may be associated with additional third parties and separable from other of the identified service providers.

Figure 2:
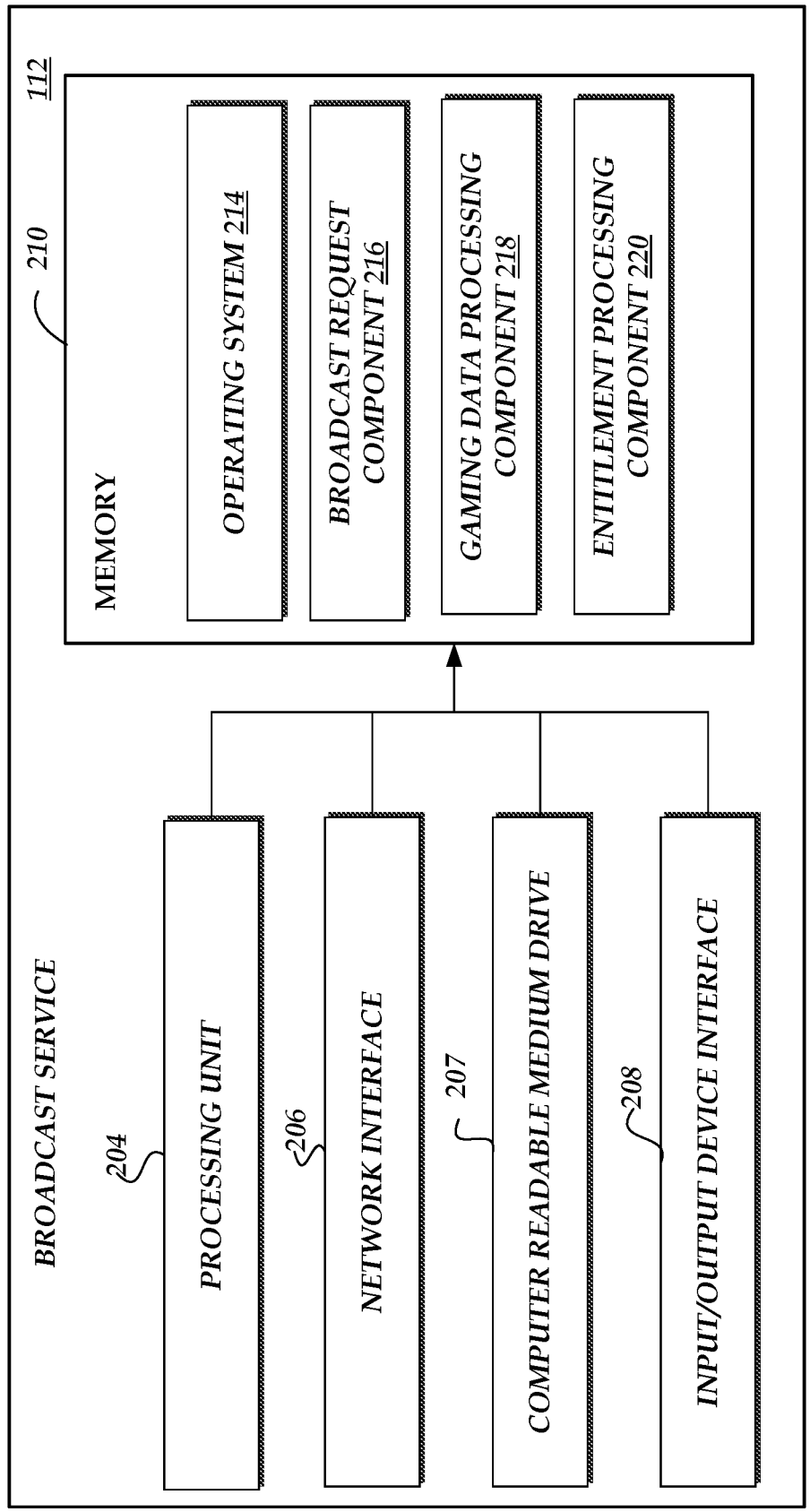
FIG. 2 is a block diagram of illustrative components of a broadcast service for providing gaming media streams in accordance with the present application.

FIG. 2 depicts one embodiment of an architecture of a computing device illustrative of a broadcast service 112 that receives and processes requests from viewing client computing devices 102 in accordance with the present application. The general architecture of the computing device for implementing the broadcast service 112 depicted in FIG. 2 includes an arrangement of computer hardware and software components that may be used to implement aspects of the present disclosure. As previously described, one or more aspects of the broadcast service 112 may be implemented in a virtualize environment provided by a hosting environment. As illustrated, the computing device includes a processing unit 204, a network interface 206, a computer readable medium drive 207, an input/output device interface 208 (which may be omitted), all of which may communicate with one another by way of a communication bus.

The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information. In some embodiments, the hosting computing device may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the computing device. The memory 210 may further include computer program instructions and other information for implementing aspects of the present disclosure. For example, in one embodiment, the memory 210 includes a broadcast request processing component 216 that can interface with a corresponding browsing component on the viewing client computing device 102 to receive requests for gaming stream information or requests for registration for entitlements. Illustratively, the broadcast request processing component 216 can interface with the gaming service 114 to request and receive gaming media stream. Additionally, in some embodiments, the memory 210 can include a gaming data processing component 218 to process incoming gaming media stream data and analyze the gaming media stream data to determine one more items or events associated with the gaming media stream, as described in various parts herein. Still further, the memory can include an entitlement processing component 220 to process entitlement workflows in view of the subscription account information and gaming media stream data. Each of the components associated with the broadcast service 112 may implement the functionality or function to interface with additional or external components to implement the related function. Additionally, although the broadcast service 112 is generally illustrated as implementing all three functionality components, each of the components may be implemented on one or more computing devices individually or as separate aspects of the broadcast service 112. Accordingly, the combination of the functionality components is only illustrative in nature.

Figure 3:
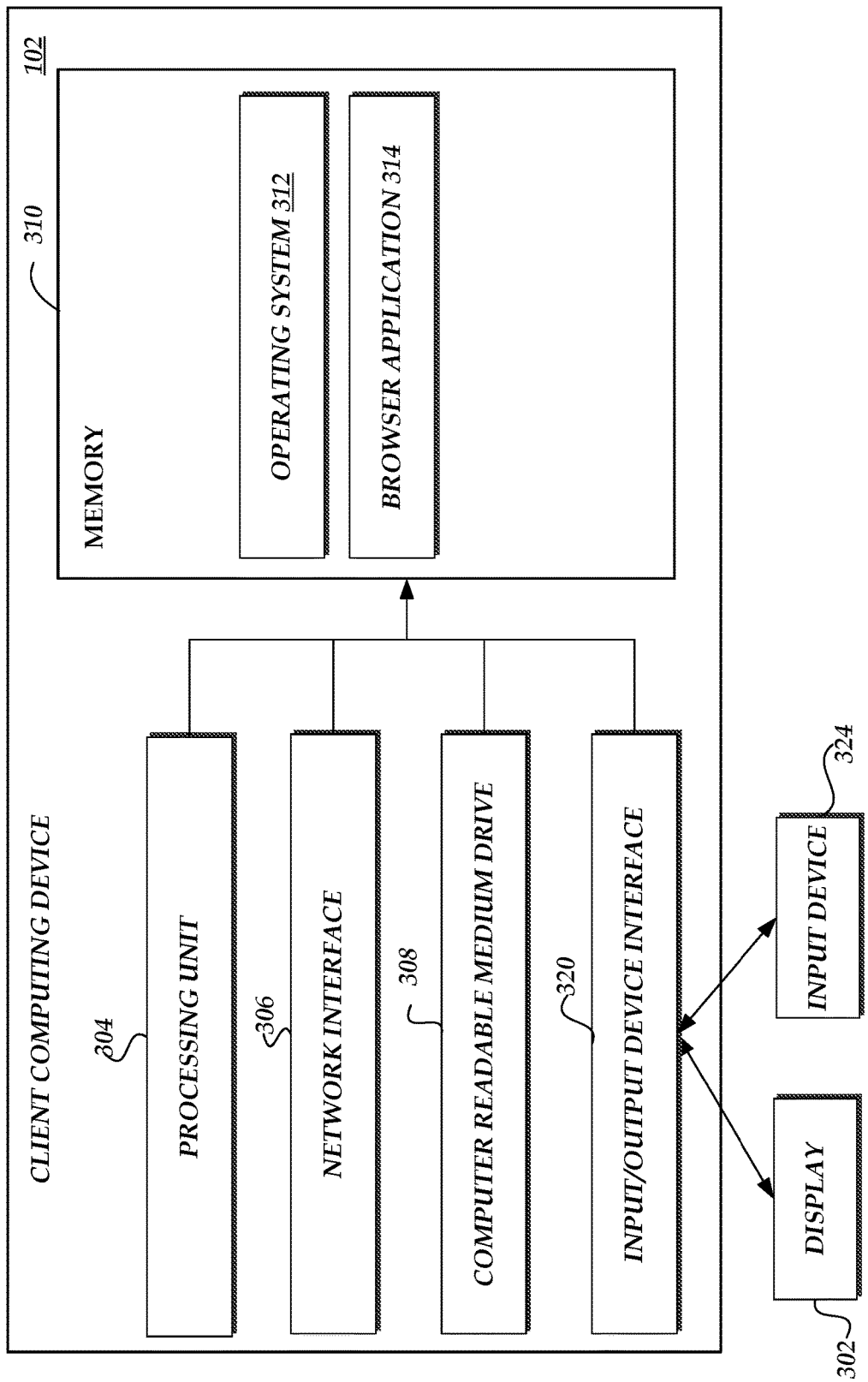
FIG. 3 is a block diagram of illustrative components of a client computing device for processing content in accordance with the present application.

FIG. 3 depicts one embodiment of an architecture of an illustrative viewing client computing device 102, that can generate requests for gaming media streams in accordance with the present application. The general architecture of the viewing client computing device 102 depicted in FIG. 3 includes an arrangement of computer hardware and software components that may be used to implement aspects of the present disclosure. As illustrated, the viewing client computing device 102 includes a processing unit 304, a network interface 306, a computer readable medium drive 308, an input/output device interface 320, one or more output devices 322 (e.g., a display), and one or more input devices 324 (e.g., keyboard or touch screen), all of which may communicate with one another by way of a communication bus. The network interface 306 may provide connectivity to one or more networks or computing systems, such as the network 106 of FIG. 1. The processing unit 304 may thus receive information and instructions from other computing systems or services via a network.

The memory 310 may include computer program instructions that the processing unit 304 executes in order to implement one or more embodiments. The memory 310 generally includes RAM, ROM, or other persistent or non-transitory memory. The memory 310 may store an operating system 312 that provides computer program instructions for use by the processing unit 304 in the general administration and operation of the viewing client computing device 102. The memory 310 may further include computer program instructions and other information for implementing aspects of the present disclosure. For example, in one embodiment, the memory 310 includes a browser application 314, or other software application, for accessing content and communicating with and processing information from the broadcast service 112. One skilled in the relevant art will appreciate that the gameplay client computing device 104 could implement a similar architecture to interact with the gaming service 114.

Figure 4A:
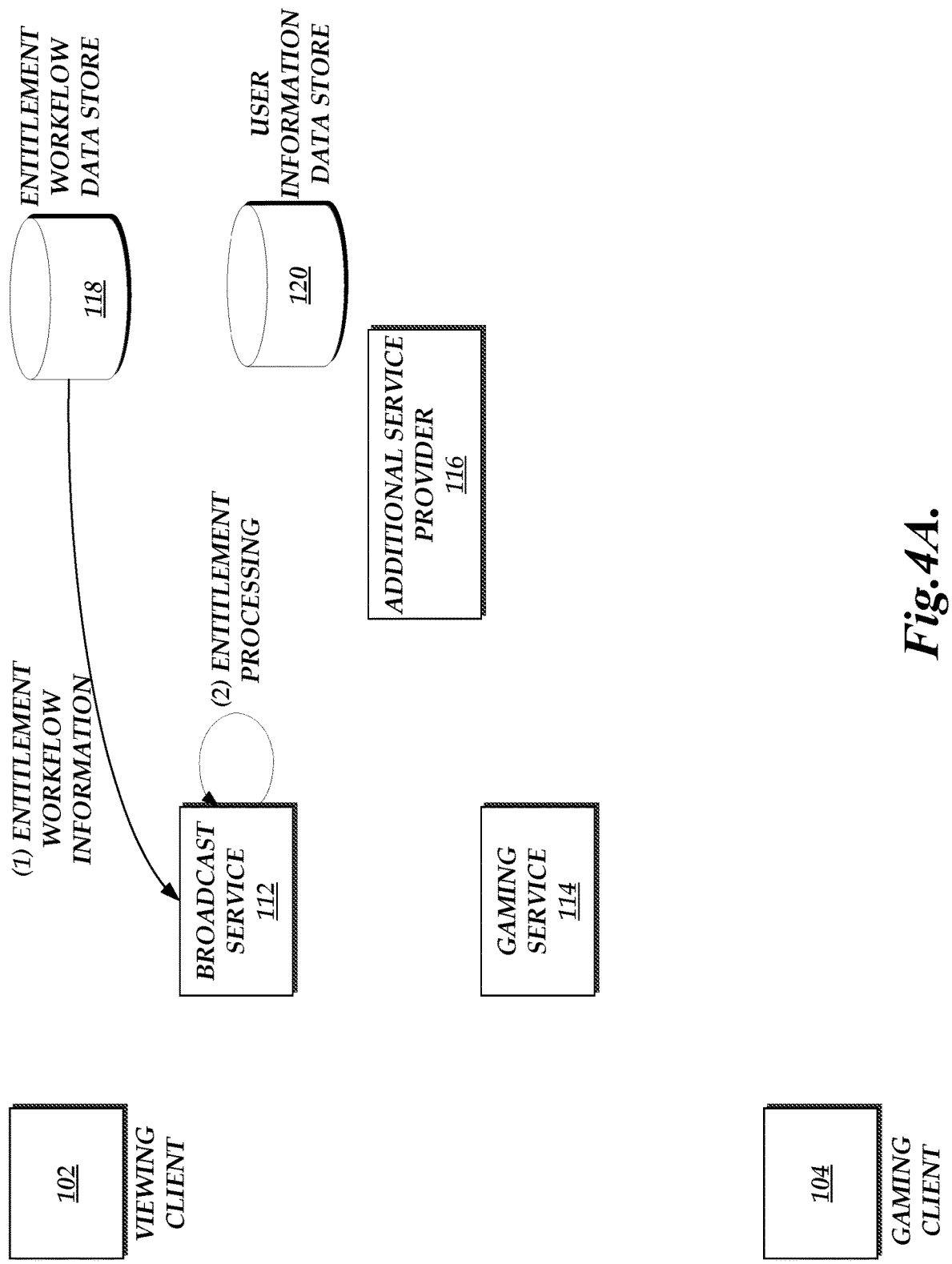
FIGS. 4A-4E are block diagrams of the logical network of FIG. 1 illustrating the requesting and processing game media streams to determine entitlements in accordance with the present application.

Turning now to FIGS. 4A-4E, illustrative interactions between the components of the logical network 100 in processing requests for gaming media content will be described. With reference to FIG. 4A, illustrative interactions between the components of the logical network 100 prior to the transmission (or concurrent with the transmission) of gaming media stream data will be described. At (1), the broadcast service 112 can obtain entitlement workflow information, from the entitlement workflow data store 118. Illustratively, the entitlement workflow information can correspond to the specification of criteria related to the access of gaming media streams and account subscriptions that qualify individual users (or groups of users) to entitlements from one or more gaming service providers 114. The entitlement workflow information can be grouped or identified by requests for specific gaming media streams, viewing or accessing items or events occurring in individual gaming media streams or types or category of gaming media streams (e.g., items or events unique to particular games or grouping of games). The entitlement workflow information can further include the specification of two or more subscription accounts from separable service providers. Still further, the entitlement workflow can further indicate (expressly or inherently) that two or more subscription accounts subscription accounts (once identified or enrolled) must remain bound to allow for additional or subsequent entitlements in the entitlement workflow.

At (2), the broadcast service 112, such as through the gaming data processing component 218, processes the entitlement workflow information to determine one or more entitlements that are available to users and to identify the criteria that will be utilize to evaluate when entitlements should be associated/awarded. Illustratively, the specification of the entitlement workflow can be done in a manner to facilitate processing of the criteria or parsing of individual criterion. Additionally, the interaction of FIG. 4A can be repeated at various intervals or upon determination of one or more events, such as the addition of new games, the update of the entitlement workflows, or registration of users for evaluation of entitlement workflows.

Figure 4B:
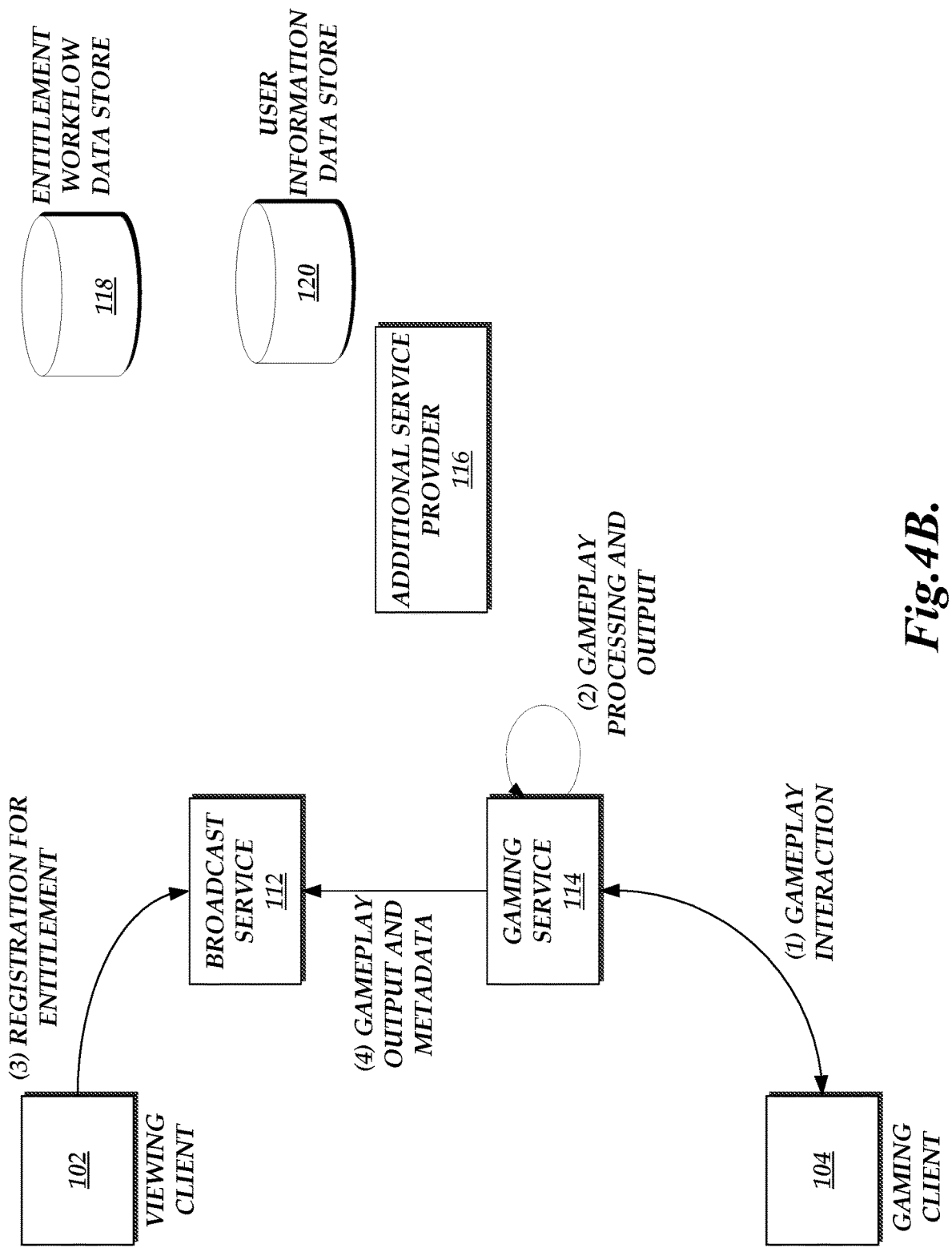

Turning now to FIG. 4B, illustrative interactions between the components of the logical network 100 with regard to the transmission and processing of requests for gaming media stream data will be described. For embodiments in which multiple viewing client devices 102 are requesting gaming media stream, at least some portion of the interaction illustrated in FIG. 4B would be repeated. Accordingly, FIG. 4B will be described with regard to a singular interaction between a viewing client 102 and the broadcast service 112, but should not be limited to such interaction. At (1), the gameplay client computing device 104 and gaming service 114 exchange interaction corresponding to the play of one or more games or other interactive activity. At (2), the result of the exchange of gameplay interaction will cause the gaming service 114 to generate one or more gaming media streams that can be broadcast to the gameplay client computing device 104. Additionally, as will be described below, at least some portion of the gaming media stream will be provided (or made accessible) to the broadcast service 112 for transmission to one or more viewing client computing devices 102. Illustratively, the gaming media stream provided by the gaming service 114 can include video content for display by a computing device, such as a browser application or other software application. The gaming media stream can also include meta-data that is associated with the presentation of the gaming media. Example of meta data can include timing information regarding the generation of outputs on the client computing device, synchronization information for correlating additional video or audio outputs, presentation information regarding settings or preferences for the video or audio output, control information regarding how the gaming media stream may be manipulated by a computing device or individual user, security and authentication information and the like. Additionally, in one embodiment, the gaming media stream can include information utilized to identify items or events that are or will occur in the gaming media stream, such as the inclusion of specific, unique identifiers corresponding to the items or events. The meta-data can further include additional information regarding the items or events that can be identified in the gaming media stream, such as the duration of the display of the item or event, a weight, priority or importance of the item or other similar information.

At (3), one or more viewing client computing devices 102 transmit requests for enrollment in an entitlement workflow to the broadcast service 112. Illustratively, the viewing client computing devices 102 can utilize one or more interfaces, such as an interface generated on a browser software application, that allows users to request access to gaming media streams or requests to enroll in entitlement workflows related to accessing gaming media streams. In this regard, in some embodiments, the request to access individual gaming media streams can be automatically interpreted or considered to be the request to enroll in corresponding entitlement workflows. The entitlement workflow registration request can include information identifying the user of the viewing client computing devices 102, such as user identifiers, passwords or other personal information. In accordance with aspects of the present application, such identification can include the account identifiers associated with the broadcast service 112 and the additional service provider 116 that will be used as the basis for the entitlement workflow. Additionally, the identification can include account identifiers that will be used to award or associate qualified entitlements to users. The request can also include information that identifies the requested gaming media stream, such as identification of general search terms, identification of types of gaming media streams (e.g., an identification of a game), identification of specific instances of a game (e.g., identification of a game and a particular gaming user), identification of particular types of gameplay users independent of game, identification of specific gameplay users independent of game, and the like.

At (4), the gaming service 114 can provide the broadcast service 112 with or more gaming media streams. In one embodiment, the gaming service 114 can automatically provide the gaming media streams to the broadcast service 112 without specific requests. In another embodiment, the gaming service 114 can provide the gaming media streams based on requests or other triggering criteria associated with the broadcast service 112. For example, the broadcast service 112 can process the request from the viewing client computing devices 102 and generate a gaming identifier request to the gaming service 114.

Figure 4C:
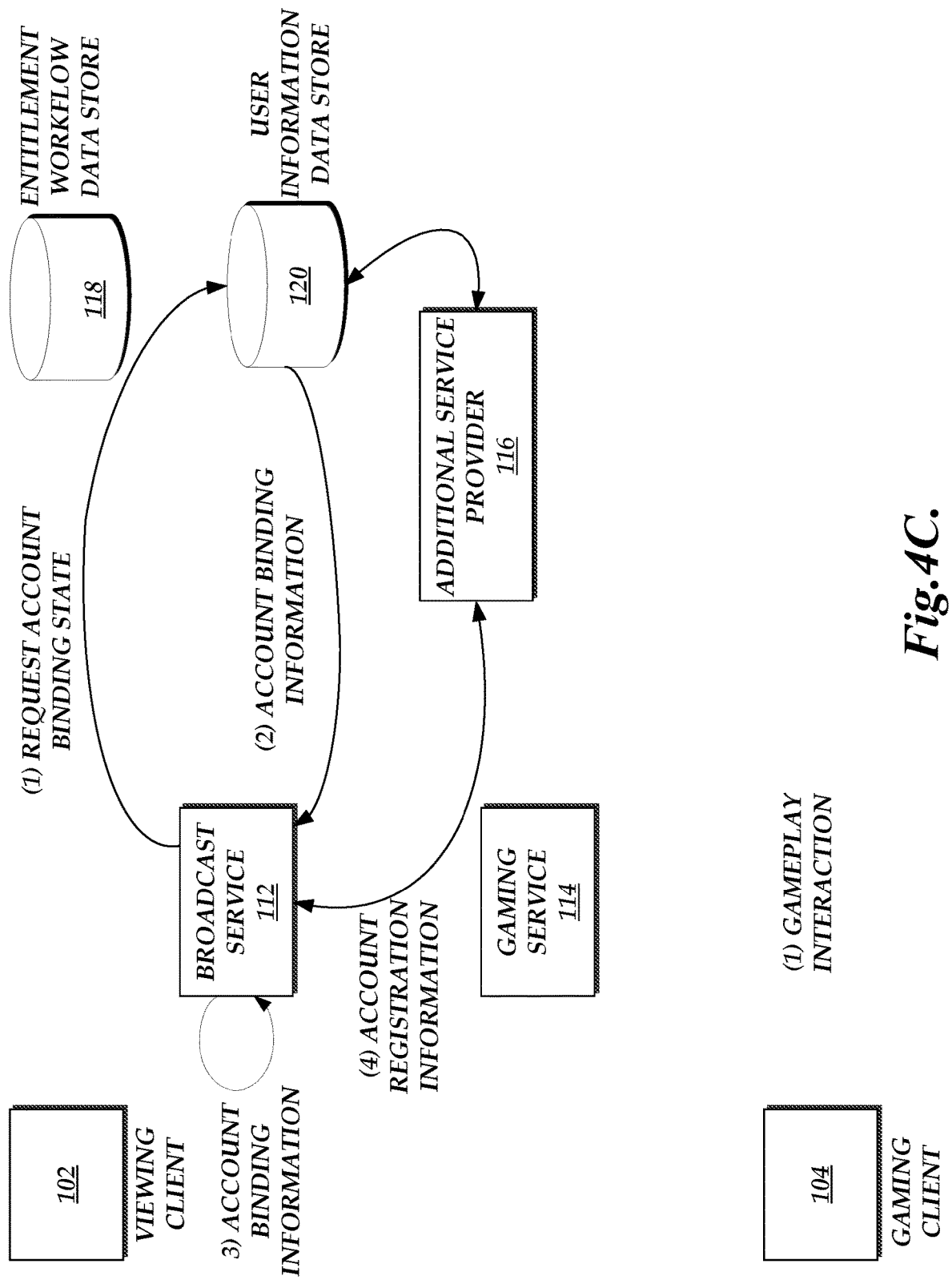

With reference now to FIG. 4C, illustrative interactions between the components of the logical network 100 for the evaluation of subscription account biding information in accordance with entitlement workflows will be described. At (1), the broadcast service 112 requests subscription account information from the user information data store 120. At (2), the subscription account information is returned to the broadcast service 112. The subscription account information can include, but is not limited to, information related to a subscription account associated with the broadcast service 112 and one or more subscription accounts associated with the additional service provider 116. The subscription account information can also identify levels or classifications of the subscription account information that may be used to evaluate qualifications for entitlements. Still further, the subscription account information can further include specific details about the subscription accounts, such as expiration dates, restrictions, etc. that may also be utilized to determine qualifications for entitlements.

At (3), the broadcast service 112 processes the subscription account information to generate a binding of subscription accounts. As discussed above, in one embodiment, the entitlement workflow utilized by broadcast service 112 can require a user to associate separable subscription accounts. Additionally, once a user has enrolled in an entitlement workflow, the entitlement workflow can specify that the two or more subscription accounts remain bound such that the user can associate different subscription accounts (e.g., multiple, short term subscription accounts) during an entitlement workflow. Accordingly, the broadcast service 112 can maintain one or more tables that track the state of subscription accounts, including a linking of multiple subscription accounts. The broadcast service 112 can utilize a single table of linked account information. In another embodiment, the broadcast service 112 can utilize multiple, linked tables in which each table is indexed by one of the linked subscription accounts and includes cross references to the other linked accounts.

At (4), the user information data store 120 receives information regarding subscription accounts from the additional service provider 116. The information can include expiration information, changes in subscription account levels or features, creation of new subscription accounts or duplicative subscription accounts, and the like. The broadcast service 112 can then utilize the updated subscription information to evaluate the entitlement workflow, as described herein. In other embodiments, the additional service provider 116 may interface directly with the broadcast service 112 or in combination with the broadcast service 112 and the user information data store 120.

Figure 4D:
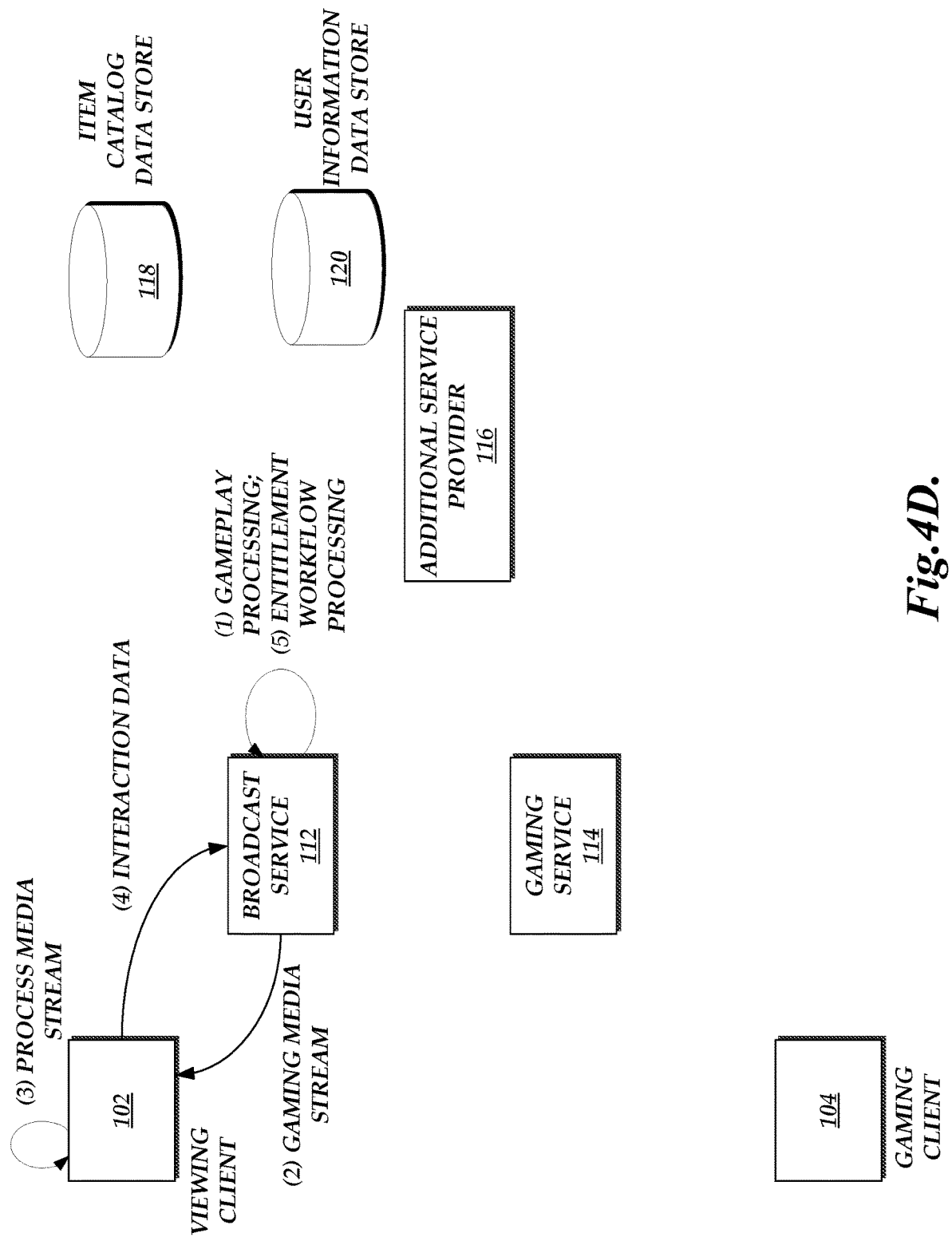

With reference now to FIG. 4D, illustrative interactions between the components of the logical network 100 for evaluating entitlement workflows associated with the broadcast of gaming media stream data will be described. At (1), the broadcast service 112 generates, or otherwise causes the generation of, a user interface that includes a requested gaming media stream and one or more recommended items. At (2), the viewing client computing device 102 obtains and processes the user interface to provide the gaming media stream to the requesting user. Illustratively, at (3), the viewing client computing device 102 can obtain additional interaction information from the requesting user. Such interaction can include selection of one or more recommended items. For example, a requesting user can select one or more recommended items to make the recommended items available for subsequent game play.

At (4), the broadcast service 112 processes the user requests for gaming media streams, applicable user interaction data, and user subscription account state information in the evaluation of entitlement workflows. More specifically, in one embodiment, the broadcast service 112 obtains current state information related bound subscription accounts and any gaming request streaming data to determine whether entitlements should be associated with the user. By way of example, an entitlement workflow may specify that a user is awarded an entitlement for a specific game on a monthly basis so long as the user maintains two subscription accounts (e.g., a broadcast service account and an additional service provider account). Initially, the broadcast service 112 links to identified accounts provided by the user. In subsequent months, the broadcast service 112 evaluates the entitlement workflow based on a determination whether the initially identified accounts remain bound. In embodiments in which one of the subscription accounts requires some form of fee, such as monthly fees after an initial free month, the maintenance of state information mitigates the opportunity for users to sequentially register for multiple accounts (with the initial free month) and sequentially satisfy the multiple subscription account criteria by updating/changing the account information. The broadcast service 112 can also consider additional criteria, including gaming media stream attribute information, specified in the entitlement workflow.

In some embodiments, the broadcast service 112 can implement some form of error processing or follow up in the event that the subscription account information is not satisfied when evaluated. If one of the subscription accounts has expired, the broadcast service 112 can generate notifications or cause a renewal process to be initiated. If a user has switch subscription accounts, the broadcast service 112 can generated notifications regarding the switched accounts. Additionally, in some instances, the broadcast service 112 can initiate termination or suspension of subscription accounts if switching accounts violates terms or policies or is otherwise characterized as an attempt to redeem entitlements improperly.

Figure 4E:
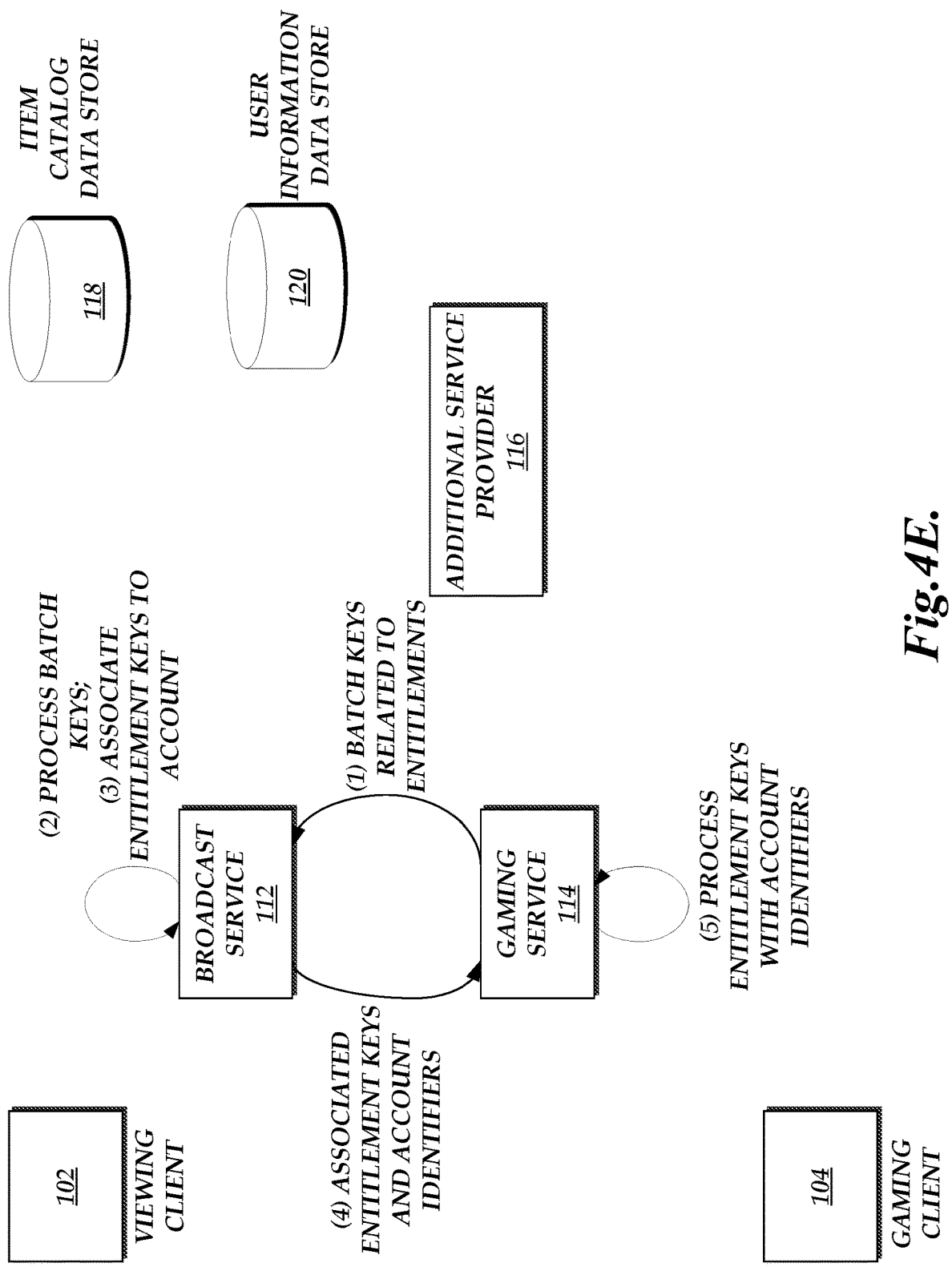

With reference now to FIG. 4E, illustrative interactions between the components of the logical network 100 for causing entitlements defined in entitlement workflows to be provided to users will be described. FIG. 4E will be described with regard to an illustrative interaction between a single gaming service 114 and the broadcast service 112. One skilled in the relevant art will appreciate that the process illustrated in FIG. 4E can be repeated for multiple gaming services 114. At (1), the gaming service 114 generates a batch set of keys that correspond to individual entitlements that can be used to grant entitlements to individual user accounts. Illustratively, each key is associated with one or more entitlements and can be granted by the gaming service 114 when received in return from the broadcast service 112.

At (2), the broadcast service 112 processes the batch set of keys. In some embodiments, the broadcast service 112 can pre-process the batch set of keys such that individual keys are pre-assigned to individual user accounts prior to the user account qualifying for the entitlement. Additionally, the broadcast service 112 can generate or obtain the specific account identifiers utilized to associate entitlements. More specifically, in one embodiment, the broadcast service 112 can interact with the gaming service 114 to generate unique account identifiers such that the broadcast service 112 can transmit an entitlement key and account identifier to the gaming service 114 to cause entitlements to be associated/ awarded. Illustratively, the broadcast service 112 and gaming service 114 can limit the amount of information required to allow for the automatic association of entitlements to users.

At (3), the broadcast service 112 processes the account information and entitlement workflows (as described above) and assigns entitlement keys for awarding of entitlements. In embodiments in which keys have been pre-assigned, the association of entitlement keys can be done very quickly. At (4), the broadcast service 112 transmits associated keys and account identifiers to the gaming service 114. In one embodiment, the broadcast service 112 can utilize application protocol interfaces ("API") provided by the gaming service 114. At (5), the gaming service 114 can process the account identifiers and keys in a manner that does not require additional requests to process from the user.

Figure 5:
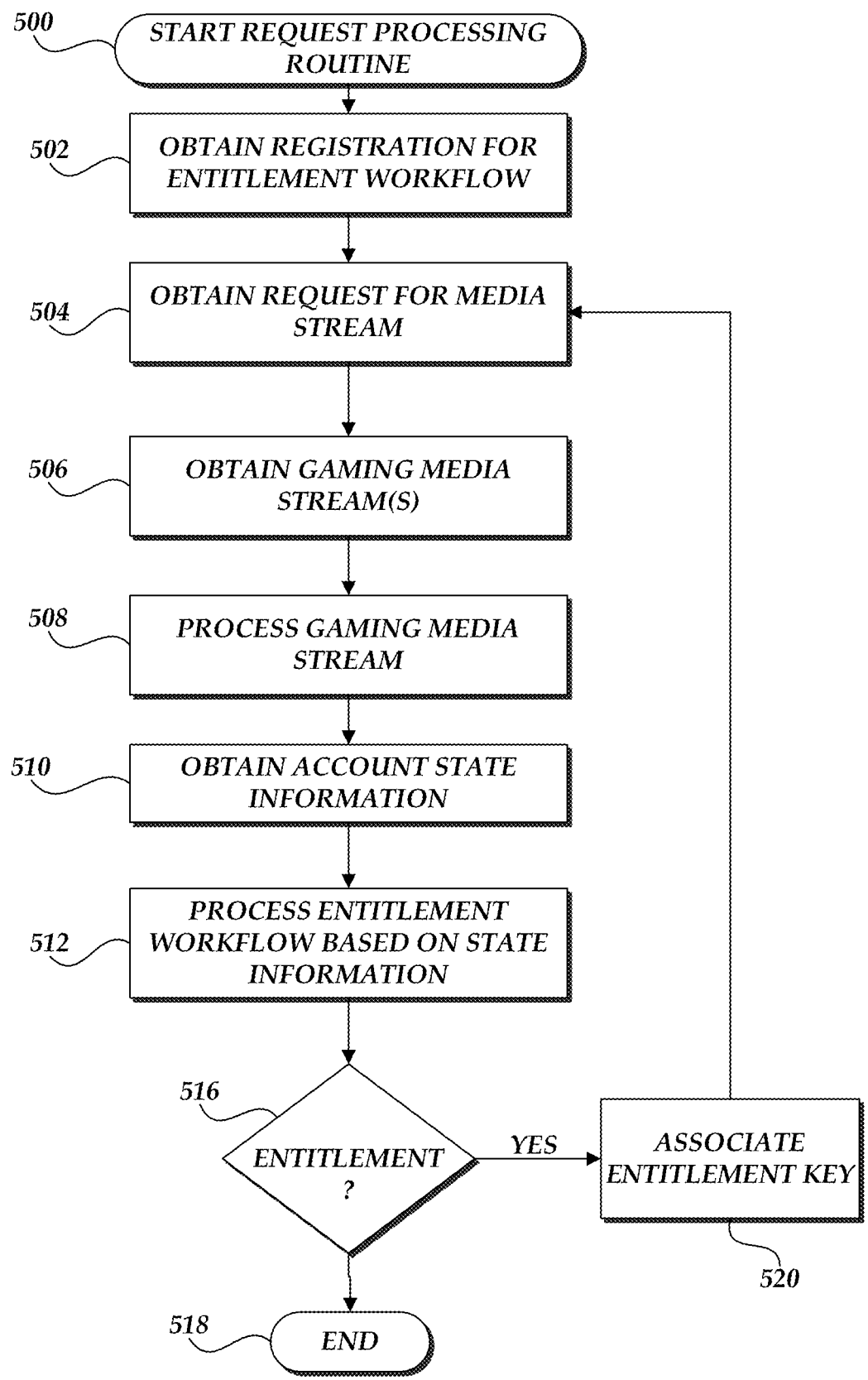
FIG. 5 is a flow diagram illustrative of a gaming media request processing routine implemented by a computing device in accordance with the present application.

FIG. 5 is a flow diagram illustrative of a gaming media request processing routine 500 implemented by a computing device in accordance with the present application. Illustratively, routine 500 may be implemented by the broadcast service 112. Routine 500 illustratively occurs concurrently with the gameplay client computing device 104 and gaming service 114 exchanging interaction data corresponding to the play of one or more games or other interactive activity. As described above, the result of the exchange of gameplay interaction will cause the gaming service 114 to generate one or more gaming media streams that can be broadcast to the gameplay client computing device 104. Additionally, as will be described below, at least some portion of the gaming media stream will be provided (or made accessible) to the broadcast service 112 for transmission to one or more viewing client computing devices 102. For purposes of illustration, routine 500 will be described with regard to singular interaction between a viewing client 102 and a broadcast service 112. Accordingly, broadcast service 112 can repeat at least some portion of routine 500 for each request to generate responsive communications to multiple requesting viewing clients 102.

Illustratively, the gaming media stream provided by the gaming service 114 can include video content for display by a computing device, such as a browser application or other software application. The gaming media stream can also include meta-data that is associated with the presentation of the gaming media. Example of meta data can include timing information regarding the generation of outputs on the client computing device, synchronization information for correlating additional video or audio outputs, presentation information regarding settings or preferences for the video or audio output, control information regarding how the gaming media stream may be manipulated by a computing device or individual user, security and authentication information and the like. Additionally, in one embodiment, the gaming media stream can include information utilized to identify items or events that are or will occur in the gaming media stream, such as the inclusion of specific, unique identifiers corresponding to the items or events. The meta-data can further include additional information regarding the items or events that can be identified in the gaming media stream, such as the duration of the display of the item or event, a weight, priority or importance of the item or other similar information.

As previously described, the broadcast service 112 can obtain entitlement workflow information, from the entitlement workflow data store 118. Illustratively, the entitlement workflow information can correspond to the specification of criteria related to the access of gaming media streams and account subscriptions that qualify individual users (or groups of users) to entitlements from one or more gaming service providers 114. The entitlement workflow information can be grouped or identified by requests for specific gaming media streams, viewing or accessing items or events occurring in individual gaming media streams or types or category of gaming media streams (e.g., items or events unique to particular games or grouping of games). The entitlement workflow information can further include the specification of two or more subscription accounts from separable service providers. Still further, the entitlement workflow can further indicate (expressly or inherently) that two or more subscription accounts subscription accounts (once identified or enrolled) must remain bound to allow for additional or subsequent entitlements in the entitlement workflow.

At block 502, the one or more viewing client computing devices 102 transmit requests for enrollment in an entitlement workflow to the broadcast service 112. Illustratively, the viewing client computing devices 102 can utilize one or more interfaces, such as an interface generated on a browser software application, that allows users to request access to gaming media streams or requests to enroll in entitlement workflows related to accessing gaming media streams. In this regard, in some embodiments, the request to access individual gaming media streams can be automatically interpreted or considered to be the request to enroll in corresponding entitlement workflows. The entitlement workflow registration request can include information identifying the user of the viewing client computing devices 102, such as user identifiers, passwords or other personal information. In accordance with aspects of the present application, such identification can include the account identifiers associated with the broadcast service 112 and the additional service provider 116 that will be used as the basis for the entitlement workflow. Additionally, the identification can include account identifiers that will be used to award or associate qualified entitlements to users. The request can also include information that identifies the requested gaming media stream, such as identification of general search terms, identification of types of gaming media streams (e.g., an identification of a game), identification of specific instances of a game (e.g., identification of a game and a particular gaming user), identification of particular types of gameplay users independent of game, identification of specific gameplay users independent of game, and the like.

At block 504, the broadcast service 112 obtains gaming media requests from one or more viewing client computing devices 102. Illustratively, the viewing client computing devices 102 can utilize one or more interfaces, such as an interface generated on a browser software application, that allows users to request access to gaming media streams. The request can include information identifying the user of the viewing client computing devices 102, such as user identifiers, passwords or other personal information. The request can also include information that identifies the requested gaming media stream, such as identification of general search terms, identification of types of gaming media streams (e.g., an identification of a game), identification of specific instances of a game (e.g., identification of a game and a particular gaming user), identification of particular types of gameplay users independent of game, identification of specific gameplay users independent of game, and the like. As previously mentioned, blocks 502 and 504 may be combined in some embodiments.

At block 506, the gaming service 114 can provide the broadcast service 112 with or more gaming media streams. In one embodiment, the gaming service 114 can automatically provide the gaming media streams to the broadcast service 112 without specific requests. In another embodiment, the gaming service 114 can provide the gaming media streams based on requests or other triggering criteria associated with the broadcast service 112. For example, the broadcast service 112 can process the request from the viewing client computing devices 102 and generate a gaming identifier request to the gaming service 114. For purposes of the present application, the gaming service 114 provides the gaming stream to the broadcast service 112 in a timing sufficient for processing the gaming stream and including recommendations, as described herein.

At block 508, the broadcast service 112 processes the gaming media streams to generate the requested gaming stream data. At block 510, the broadcast service 112 obtains account state information and at block 512 processes the user requests for gaming media streams, applicable user interaction data, and user subscription account state information in the evaluation of entitlement workflows. More specifically, in one embodiment, the broadcast service 112 obtains current state information related bound subscription accounts and any gaming request streaming data to determine whether entitlements should be associated with the user. By way of example, an entitlement workflow may specify that a user is awarded an entitlement for a specific game on a monthly basis so long as the user maintains two subscription accounts (e.g., a broadcast service account and an additional service provider account). Initially, the broadcast service 112 links to identified accounts provided by the user. In subsequent months, the broadcast service 112 evaluates the entitlement workflow based on a determination whether the initially identified accounts remain bound. In embodiments in which one of the subscription accounts requires some form of fee, such as monthly fees after an initial free month, the maintenance of state information mitigates the opportunity for users to sequentially register for multiple accounts (with the initial free month) and sequentially satisfy the multiple subscription account criteria by updating/changing the account information. The broadcast service 112 can also consider additional criteria, including gaming media stream attribute information, specified in the entitlement workflow.

At decision block 516, a test is conducted to determine whether entitlements have been authorized or qualified. If not, the routine 500 ends at block 518. Additionally, in some embodiments, the broadcast service 112 can implement some form of error processing or follow up in the event that the subscription account information is not satisfied when evaluated. If one of the subscription accounts has expired, the broadcast service 112 can generate notifications or cause a renewal process to be initiated. If a user has switch subscription accounts, the broadcast service 112 can generated notifications regarding the switched accounts. Additionally, in some instances, the broadcast service 112 can initiate termination or suspension of subscription accounts if switching accounts violates terms or policies or is otherwise characterized as an attempt to redeem entitlements improperly.

If at decision block 516, an entitlement has been authorized, at block 520, the broadcast service 112 can associate keys. In embodiments in which keys have been pre-assigned, the association of entitlement keys can be done very quickly. Illustratively, the broadcast service 112 transmits associated keys and account identifiers to the gaming service 114, such as via APIs. As described above, the gaming service 114 can process the account identifiers and keys in a manner that does not require additional requests to process from the user.

Figure 6:
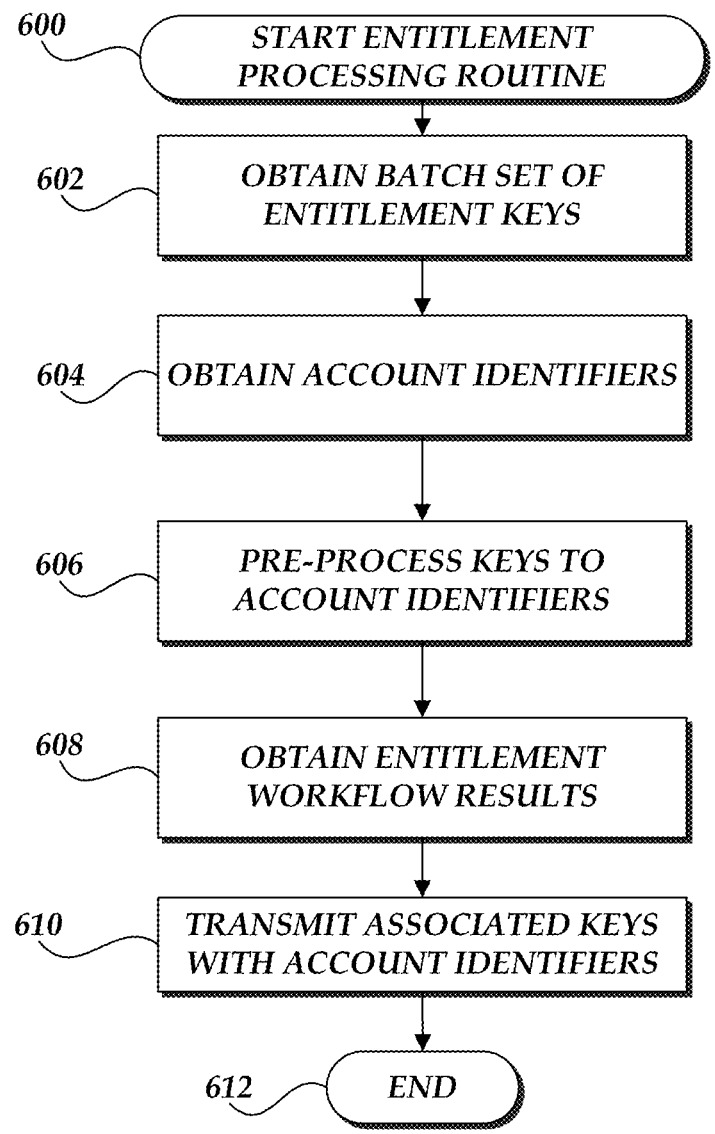
FIG. 6 is a flow diagram illustrative of an entitlement processing routine implemented by a computing device in accordance with the present application.

FIG. 6 is a flow diagram illustrative of an entitlement processing routine 600 implemented by a computing device in accordance with the present application. Illustratively, routine 600 may be implemented by the broadcast service 112. Routine 600 illustratively occurs concurrently with the processing of account and game play request data. For purposes of illustration, routine 600 will be described with regard to singular interaction between a gaming service 113 and a broadcast service 112. Accordingly, broadcast service 112 can repeat at least some portion of routine 600 for multiple gaming services 114.

At block 602, the broadcast service 112 obtains a batch set of entitlement keys. Illustratively, the gaming service 114 generates a batch set of keys that correspond to individual entitlements that can be used to grant entitlements to individual user accounts. Illustratively, each key is associated with one or more entitlements and can be granted by the gaming service 114 when received in return from the broadcast service 112.

At block 604, the broadcast service 112 can generate or obtain the specific account identifiers utilized to associate entitlements. More specifically, in one embodiment, the broadcast service 112 can interact with the gaming service 114 to generate unique account identifiers such that the broadcast service 112 can transmit an entitlement key and account identifier to the gaming service 114 to cause entitlements to be associated/awarded. Illustratively, the broadcast service 112 and gaming service 114 can limit the amount of information required to allow for the automatic association of entitlements to users.

At block 606 the broadcast service 112 pre-processes the batch set of keys. In some embodiments, the broadcast service 112 can pre-process the batch set of keys such that individual keys are pre-assigned to individual user accounts prior to the user account qualifying for the entitlement. At block 608, the broadcast service 112 processes the results of the account information and entitlement workflows (as described above) and determines entitlement keys for awarding of entitlements. In embodiments in which keys have been pre-assigned, the association of entitlement keys can be done very quickly. At block 601, the broadcast service 112 transmits associated keys and account identifiers to the gaming service 114. In one embodiment, the broadcast service 112 can utilize application protocol interfaces ("API") provided by the gaming service 114. As previously described, the gaming service 114 can process the account identifiers and keys in a manner that does not require additional requests to process from the user. At block 612, the routine 600 terminates.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing media stream contextual recommendations comprising;
    a gaming media streaming service computing device including a first one or more processors and memory, the gaming media streaming service computing device implementing a gaming media streaming service generating one or more gaming media streams corresponding to interaction between a first user and the gaming media streaming service; and a gaming media viewing service computing device including a second one or more processors and memory, the gaming media viewing service computing device implementing a gaming media viewing service by executing specific computer-executable instructions to:
- obtain a gaming media stream request from a second user for receiving a gaming media stream, wherein the gaming media stream request is associated with a user identifier associated with the second user and a gaming identifier corresponding to the first user;
- obtain an entitlement registration request associated with the gaming identifier, the entitlement registration request including an identification of a first subscription account associated with the gaming media streaming service and a second subscription account associated with an additional service provider;
- obtain state information corresponding to a binding of the first subscription account associated with the gaming media streaming service and the second subscription account associated with the additional service provider;
- obtain the gaming media stream corresponding to the gaming identifier;
- obtain an entitlement workflow corresponding to the entitlement registration request, the entitlement workflow including criteria for determining whether entitlements should be awarded;
- process the entitlement workflow based on the state information to identify an entitlement and determine whether the identified entitlement should be awarded; and
- in response to a determination that the entitlement should be awarded, cause a transmission of an entitlement key corresponding to the identified entitlement to the gaming media streaming service computing device.

2. The system as recited in claim 1, wherein the gaming media viewing service computing device further implements the gaming media viewing service by executing specific computer-executable instructions to obtain a batch set of entitlement keys from the gaming media streaming service computing device.

3. The system as recited in claim 2, wherein the gaming media viewing service computing device further implements the gaming media viewing service by executing specific computer-executable instructions to pre-assign the batch set of entitlement keys prior the determination that the identified entitlement should be awarded.

4. The system as recited in claim 1, wherein the gaming media viewing service computing device further implements the gaming media viewing service by executing specific computer-executable instructions to obtain updated state information corresponding to the binding of the first subscription account associated with the gaming media streaming service and the second subscription account associated with the additional service provider.

5. The system as recited in claim 4, wherein the gaming media viewing service computing device further implements the gaming media viewing service by executing specific computer-executable instructions to process the updated state information to determine whether the updated state information is indicative of a change in the binding of the first subscription account.

6. A computer-implemented method for viewing of media streams, comprising:
- obtaining a request for qualification for an entitlement associated with a gaming media stream, wherein the request is associated with a first subscription account associated with a gaming media viewing service and a second subscription account associated with an additional service provider;
- obtaining state information corresponding to a binding of the first subscription account associated with a gaming media viewing service and the second subscription account associated with an additional service provider; and
- determining that the entitlement should be provided based on the state information.

7. The computer-implemented method as recited in claim 6 further comprising obtaining a request to access the gaming media stream.

8. The computer-implemented method as recited in claim 7, wherein the request to access the gaming media stream corresponds to the request for qualification for the entitlement.

9. The computer-implemented method as recited in claim 6 further comprising causing generation of the gaming media stream in response to the request for qualification for the entitlement.

10. The computer-implemented method as recited in claim 6 further comprising obtaining updated state information corresponding to the binding of the first subscription account associated with the gaming media viewing service and the second subscription account associated with the additional service provider.

11. The computer-implemented method as recited in claim 10 further comprising processing the updated state information to determine whether the updated state information is indicative of a change in the binding of the first subscription account.

12. The computer-implemented method as recited in claim 6 further comprising storing the state information in at least one table.

13. The computer-implemented method as recited in claim 12, wherein the at least one table includes two or more tables in which individual tables correspond to individual subscription accounts.

14. The computer-implemented method as recited in claim 6 further comprising causing a transmission of an entitlement key to a gaming media streaming service based on determining that the entitlement should be provided.

15. The computer-implemented method as recited in claim 14 further comprising obtaining a batch set of entitlement keys from the gaming media streaming service.

16. The computer-implemented method as recited in claim 15 further comprising pre-assigning the batch set of entitlement keys prior to determining that the entitlement should be awarded.

17. Non-transitory computer-readable media including computer-executable instructions that, when executed by a computing system, cause the computing system to:
- obtain a request related to accessing gaming media stream information related to a user account;
- determine whether one or more entitlements should be provided to the user account based on state information associated with two or more bound user accounts; and cause a transmission of an entitlement key to a gaming media streaming service in response to a determination that the one or more entitlements should be provided to the user account.

18. The non-transitory computer readable media of claim 17 including further computer-executable instructions that, when executed by the computing system, cause the computing system to obtain a request for receiving the one or more entitlements.

19. The non-transitory computer readable media of claim 17 including further computer-executable instructions that, when executed by the computing system, cause the computing system to obtain updated state information.

20. The non-transitory computer readable media of claim 18 including further computer-executable instructions that, when executed by the computing system, cause the computing system to implement one or more additional steps based on a determination of a change in the state information.

* * * * *

UNITED STATES PATENT AND TRADEMARK OFFICE
CERTIFICATE OF CORRECTION

PATENT NO. : 10,616,293 B1
APPLICATION NO. : 15/627244
DATED : April 7, 2020
INVENTOR(S) : Jing Zeng et al.

It is certified that error appears in the above-identified patent and that said Letters Patent is hereby corrected as shown below:

On the Title Page

Item (72), Inventors, Line 2, delete "Theil" and insert --Thiel--.

In the Specification

In Column 3, Line 67, delete "3" and insert --3.--.

In Column 7, Line 33, delete "meta data" and insert --meta-data--.

In Column 10, Line 65, delete "meta data" and insert --meta-data--.

In the Claims

In Column 17, Line 5, Claim 18, delete "computer readable" and insert --computer-readable--.

In Column 17, Line 10, Claim 19, delete "computer readable" and insert --computer-readable--.

In Column 17, Line 14, Claim 20, delete "computer readable" and insert --computer-readable--.

Signed and Sealed this
First Day of September, 2020

Andrei Iancu
*Director of the United States Patent and Trademark Office*